March 27, 1934.  G. K. HULL  1,952,319
PIPE ASSEMBLING AND WELDING APPARATUS
Filed July 29, 1932    4 Sheets-Sheet 1
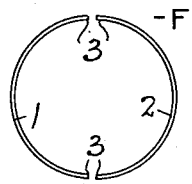
-FIG.1.-
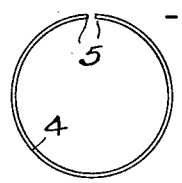
-FIG.2.-
-FIG.3.-
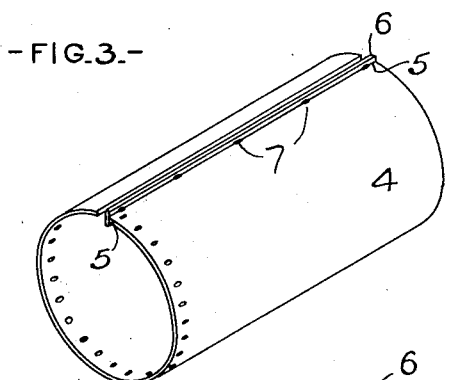
-FIG.6.-
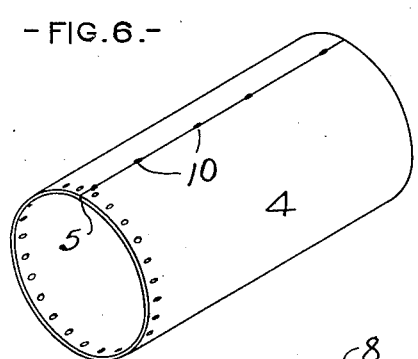
-FIG.4.-
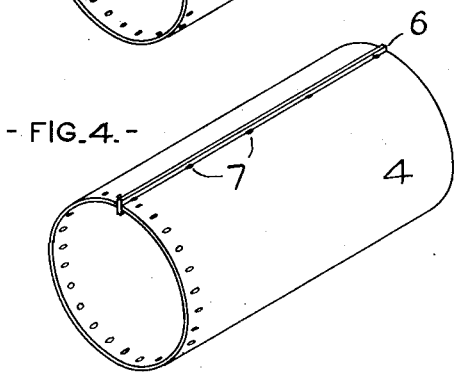
-FIG.5.-
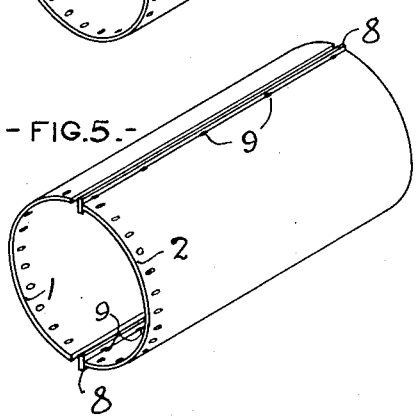
-FIG.7.-
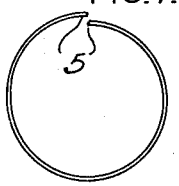
-FIG.8.-
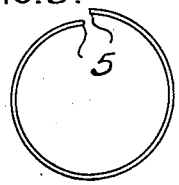
-FIG.9.-
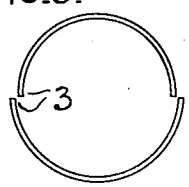
-FIG.10.-
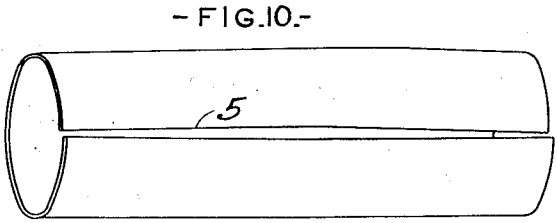
INVENTOR
George K. Hull
BY S.C. Yeaton
ATTORNEY

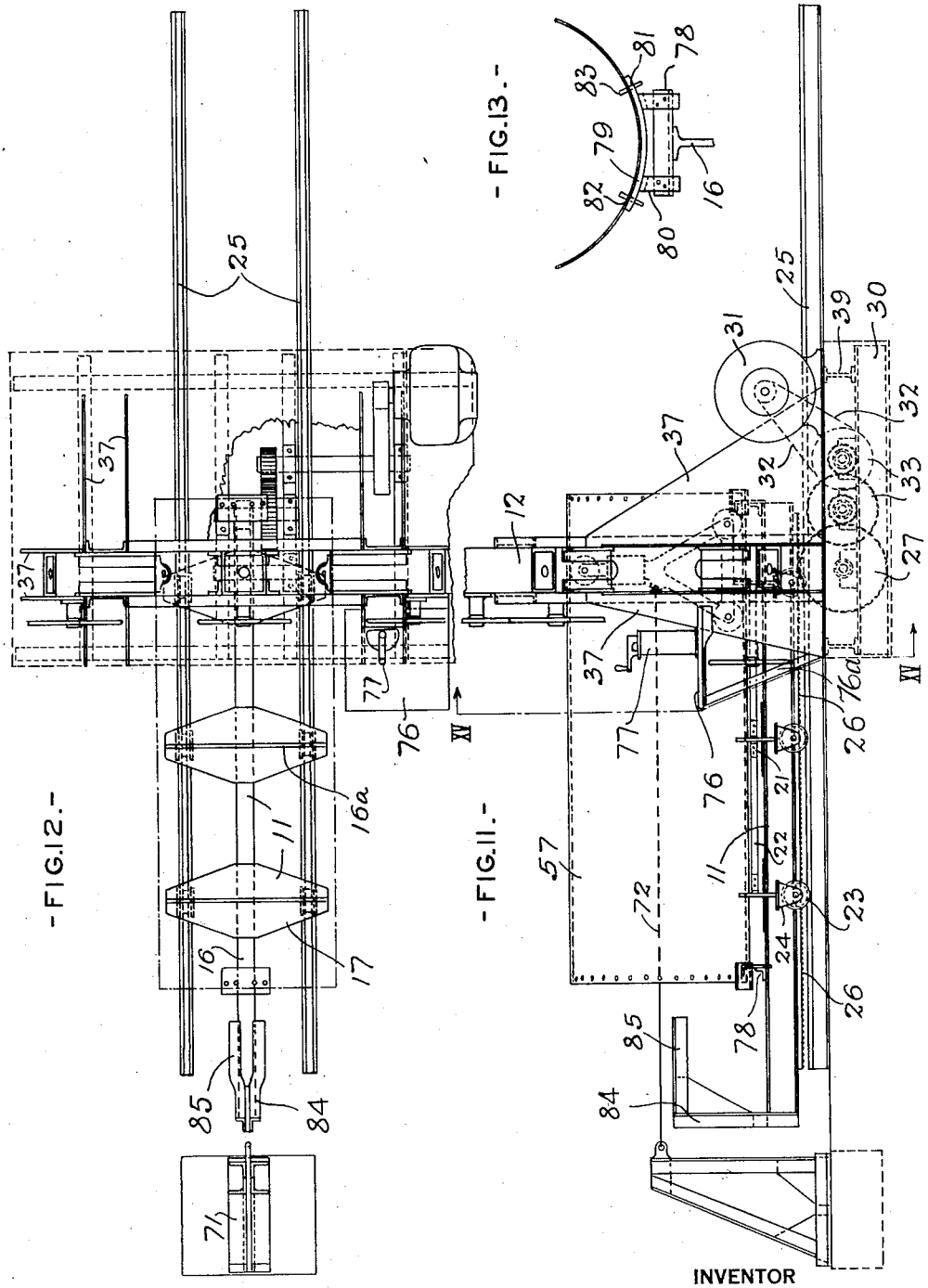

March 27, 1934.　　　　G. K. HULL　　　　1,952,319
PIPE ASSEMBLING AND WELDING APPARATUS
Filed July 29, 1932　　　4 Sheets-Sheet 3
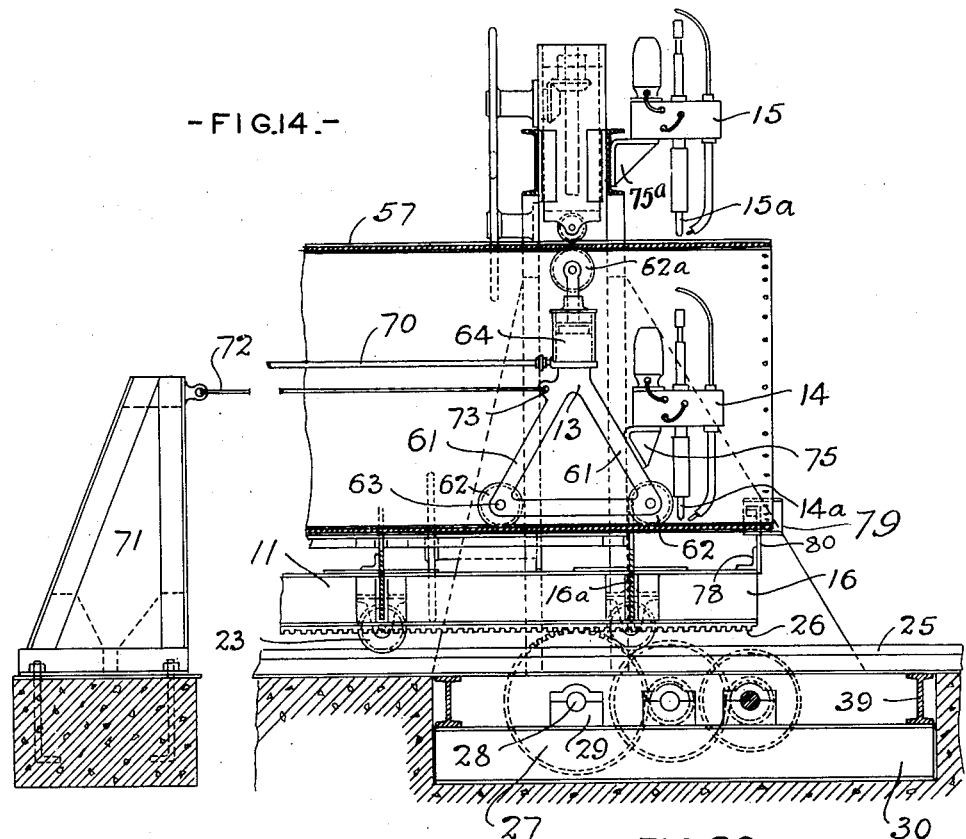
INVENTOR
George K. Hull
BY S. C. Yeaton
ATTORNEY March 27, 1934.    G. K. HULL    1,952,319
PIPE ASSEMBLING AND WELDING APPARATUS
Filed July 29, 1932    4 Sheets-Sheet 4
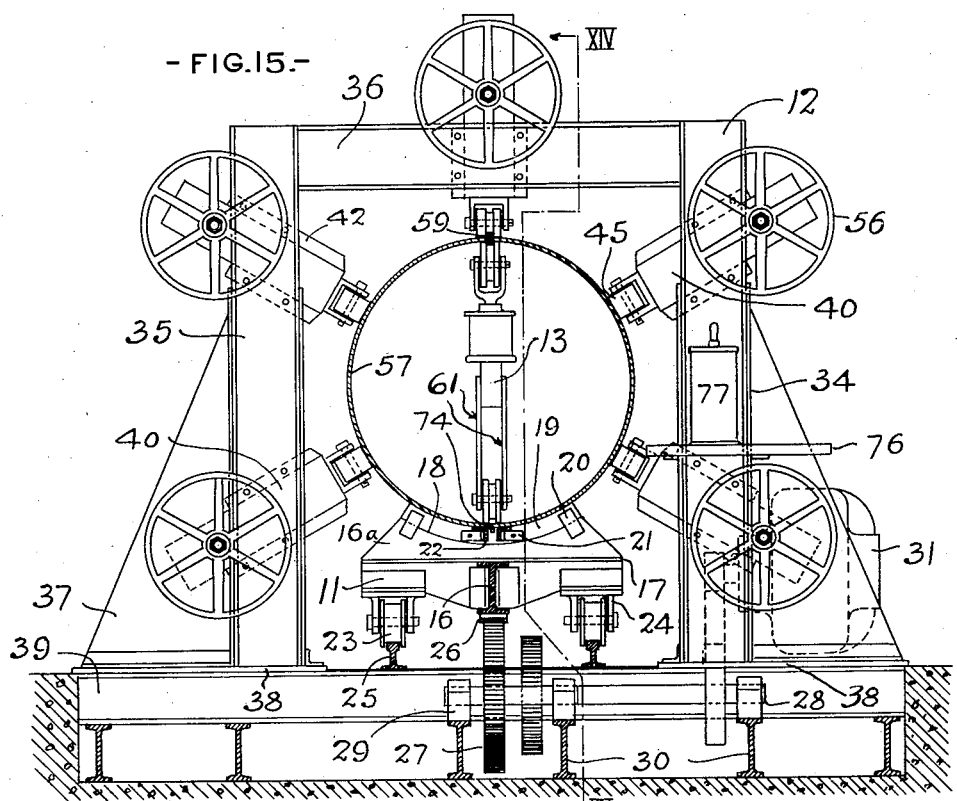
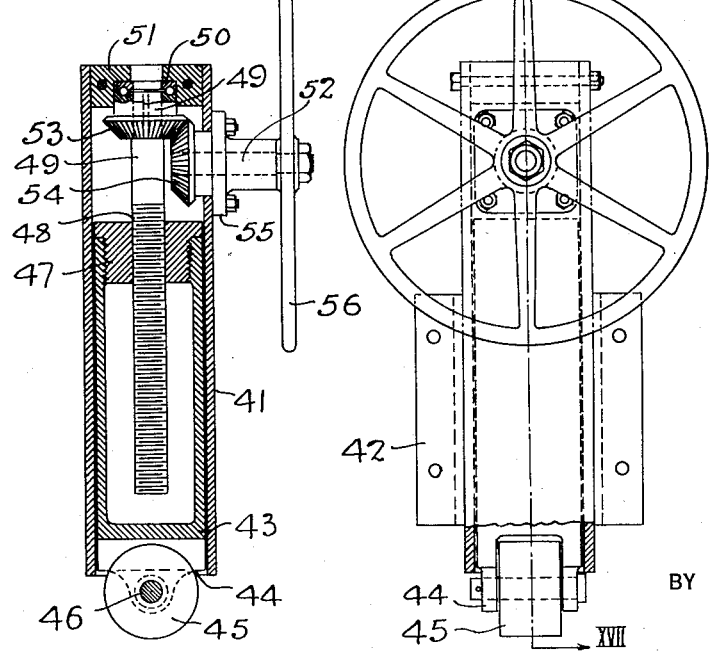
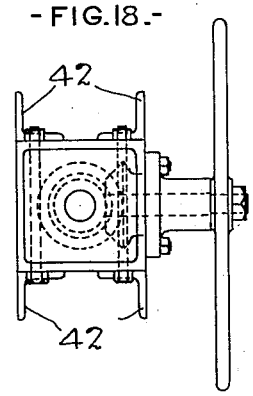
INVENTOR
George K. Hull
BY S. C. Yeaton
ATTORNEY Patented Mar. 27, 1934

1,952,319

UNITED STATES PATENT OFFICE 1,952,319

PIPE ASSEMBLING AND WELDING APPARATUS

George K. Hull, Fredonia, N. Y.

Application July 29, 1932, Serial No. 625,699

5 Claims. (Cl. 219—6)

This invention relates to apparatus for assembling and welding cylinders or pipes.

An object of the invention is to provide an improved apparatus for holding a cylindrically curved material, effecting alignment of adjacent longitudinal edges thereof, and securing said edges together by welding.

Other and further objects and advantages achieved by the present invention will be apparent from the following detailed description of an embodiment thereof.

The invention is illustrated in the accompanying drawings wherein Figure 1 is an end view of two pieces of cylindrically curved material with their adjacent longitudinal edges in proper alignment for assembling; Fig. 2 is an end view of one piece of cylindrically curved material with its longitudinal edges adjacent each other and in proper alignment for assembling; Figs. 3 to 6 are isometric views of pieces of cylindrically curved material at certain stages during their assembling into completed cylinders; Figs. 7, 8 and 9 are end views and Fig. 10 is an isometric view of pieces of cylinder material with their longitudinal adjacent edges out of alignment before assembling by the apparatus of the present invention; Fig. 11 is a longitudinal side elevation of the apparatus of the present invention, with a cylinder supported thereon; Fig. 12 is a plan view of the structure shown in Fig. 11, with the cylinder shown in broken lines and with a part broken away. Fig. 13 is an end view of the supporting rack of the apparatus, with a cylinder, shown in part, secured thereto; Fig. 14 is a longitudinal sectional view of a part of the apparatus on the line XIV—XIV of Fig. 15; Fig. 15 is an enlarged view of the apparatus, partly in section, on the line XV—XV of Fig. 11; Fig. 16 is a still further enlarged view of one of the adjustable roller units of the apparatus; Fig. 17 is a sectional view on the line XVII—XVII of Fig. 16; Fig. 18 is a plan view of the structure of Fig. 16; Fig. 19 is an enlarged fragmentary view, partly in section of a part of the spreader unit and a part of the upper adjustable roller unit of the apparatus, with the adjacent longitudinal edges of the cylinder material and a weld bar between the rollers of the units; and Fig. 20 is an end view of the units shown in Fig. 19, with the adjacent longitudinal edges of the cylinder material between the rollers of the units, without a weld bar.

Referring in detail to the drawings, in the practice of assembling the parts forming the cylinders or pipes, the material, usually metal sheets, from which the cylinders are constructed, is first cylindrically curved so that by joining together in proper alignment the adjacent longitudinal edges thereof, a complete cylinder will be formed. This curved material may comprise a plurality of separate parts 1 and 2 (Fig. 1). Here the adjacent longitudinal edges 3 are shown in properly aligned positions, as effected by the apparatus of the present invention, as will presently appear. However, the curved material may be in one piece 4 (Fig. 2). Here also, the edges 5 are in proper alignment.

In usual practice, the curved cylindrical material, is prepared for the welding of the longitudinal edges together in either of two manners. In one maner, a weld bar 6 is tack-welded by hand to one of the longitudinal edges 5 of the material, as indicated at 7 in Fig. 3. The material is then ready to be placed in the apparatus of the present invention for assembling therein and, by means of said apparatus, the adjacent longitudinal edges are brought together in proper alignment, with the weld bar disposed therebetween, as shown in Fig. 4, and the other edge is tack-welded to the weld bar at intervals similar to the welds 7. Where the curved cylindrical material is in two pieces, 1 and 2, a weld bar 8 is tack-welded as indicated at 9 to one edge, of each of the pairs of adjacent longitudinal edges, of the parts as shown in Fig. 5. The material is thereupon placed in the apparatus of the present invention and the adjacent longitudinal edges are brought together and tack-welded in the same manner as described with reference to Fig. 3. In the other manner of assembling the cylinder, a weld bar is not used, but as shown in Fig. 6, the adjacent edges 5 of the material 4 are brought firmly together and tack-welded at 10 while in the assembling apparatus.

In Figs. 7 to 10 there are illustrated different shapes of the cylindrically curved material, typical of the form in which it is received from the plate rolls or bending machines, before the assembling operation by the apparatus of the present invention. In these figures the misalignments of the adjacent longitudinal edges 3 and 5 will be apparent. The apparatus of the present invention corrects these misalignments and holds the adjacent longitudinal edges of the material, and the weld bar, when the latter is employed, in proper alignment while the edges are tack-welded by hand and a complete cylinder is formed and placed in readiness for a separate welding machine (not shown) which makes a complete and continuous weld along the said edges. When the welding apparatus hereinafter described is used in combination with the roller and spreader units the entire welding work is done while the material is in the assembling apparatus.

Referring descriptively to the embodiment of the apparatus of the present invention which has been selected for exemplification herein, this apparatus comprises four main features, to wit, a movable supporting unit for the cylindrically curved material indicated generally by the numeral 11, an adjustable roller assemblage indicated generally by the numeral 12, a spreader unit indicated generally by the numeral 13, and welding units 14 and 15.

The supporting unit 11 comprises a longitudinal centrally disposed beam 16 having a plurality of transverse vertical plate members 16a secured thereto, at spaced intervals thereon, with horizontal transverse strengthening webs 17 extending from the opposite sides of the plate members 16a. The plate members 16a are of concave form at their tops, at 18, and a removable sector 19 is provided for each plate member, the sectors 19 being convex at their bottom, of complementary shape to the concave tops of the plate members and are held in position on said plate members by arms 20 which are secured to the plate members and extend upwardly therefrom on the opposite sides thereof, providing pockets for the sectors.

Centrally on the sectors 19, knee brackets 21 are secured, and angle irons 22 are secured to the brackets 21. The upper edges of the sectors 19 are concave so as to snugly engage the cylindrically curved material and the upper horizontal legs of the angle irons are flush with the upper edges of the sectors, the angle irons providing a base immediately below the lower rollers of the spreader unit hereinafter to be descibed. By providing sectors which are removable they may be changed when desired so that sectors with different degrees of curvature of their upper edges may be employed for different sized cylindrically curved material.

At the opposite ends of the transverse plate members 16a flanged rollers 23 are provided. The rollers 23 are journalled in suitable bearings 24, which are, in turn, secured to the transverse plate members 16a. A pair of parallel longitudinal tracks 25 are provided for the rollers 23, and the supporting unit 11 is thus adapted to run along the tracks.

At the bottom of the beam 16 a rack 26 is provided extending throughout the length of said beam, and a spur wheel 27 is mounted beneath the rack with its teeth in engagement with the teeth of the rack, the spur wheel being provided with a shaft 28 suitably journalled in bearings 29, which are supported on certain of the longitudinal I-beams 30. For driving the supporting units, a motor 31 is provided. The motor is connected by pulley and belt transmission 32, and a train of gears 33 with the spur wheel 27, the power and transmission assemblage being supported on the longitudinal beams 30.

The adjustable roller assemblage 12 comprises a frame 34 having two oppositely disposed pairs of spaced vertical beams 35 and a pair of spaced horizontal transverse beams 36 connecting the oppositely disposed pairs of vertical beams at the upper ends thereof. The beams 35 are provided with laterally extending stiffening webs 37 at the lower part thereof which join with horizontal base plates 38, the base plates, webs, and vertical beams, being suitably welded together. The base plates are supported by a suitable foundation, including transverse I-beams 39 which rest upon the longitudinal I-beams 30.

A plurality of adjustable roller units 40 are secured to the frame 34, two of the units being secured to each pair of the vertical beams 35 and one unit being secured to the pair of transverse beams 36. Each unit comprises a longitudinal box-shaped hollow casing 41 having flanges 42 extending laterally therefrom on opposite sides thereof, the units being disposed between the beams of the several pairs and secured thereto by bolts passed through the flanges and through the beams. A hollow piston element 43 is disposed within each casing 41 and adapted to reciprocate therein. Spaced lugs 44 are provided at the inner end of the piston element 43 and a roller 45 is rotatably secured to the lugs, by pin 46. The piston element 43 is square in transverse section corresponding to the casing 41 so that the piston element cannot turn relative to the casing.

At the outer end of the piston element a nut 47 is provided, the nut being rigidly secured to the piston element and provided with a centrally threaded bore 48. A longitudinal screw 49, threaded externally throughout the greater part of its length engages the nut and is disposed centrally within the casing 41, the outer end of the screw engaging a thrust bearing indicated generally by the numeral 50. The thrust bearing is held in place by a supporting block 51 which is secured to the casing 41. The screw 49 is provided with a bevel gear 53 mounted thereon and rigidly secured thereto within the casing adjacent the bearing and adapted to rotate the screw. A second bevel gear 54 is mounted in a suitable bearing 55 secured in a side of the casing 41, the gear 54 meshing with the gear 53 and being rigidly connected by a shaft 52 to a handwheel 56. It will thus be apparent that when the hand-wheel is turned, the resultant movement of the gears 53 and 54 will effect a rotation of the screw 49, which as it is held against longitudinal movement by the thrust bearing 50 and mating gear 54, will effect reciprocation of the piston element 43 by virtue of its engagement with the non-rotatable nut 47. The units 40 are so arranged on the frame 34 that their rollers extend radially inwardly from the frame and are symmetrically disposed, describing circular formation when suitably adjusted.

In the operation of the apparatus cylindrically curved material 57 is carried on the supporting unit 11 as hereinafter more fully described, and the rollers of the units 40 are brought to bear upon the outer surface of the material. By turning the hand-wheels 56, the rollers may be adjusted so as to exert the desired pressure against the outer surface of the material. The roller 45 of the upper roller unit is provided with a peripheral groove 58, centrally in its surface so that a weld bar 59 disposed between the adjacent longitudinal edges of the material 57, in the manner hereinbefore described, may extend, at the outer surface of said material, into said groove, and the roller 45 will not be disturbed thereby.

The spreader unit 13 comprises a pair of spaced parallel, triangular-shaped frame members 61. Between the frame members at the opposite lower corners thereof, rollers 62, are journalled on pins 63, passed through the frame members and the rollers. A vertical cylinder 64 is secured to the upper ends of the frame members 61 and a piston 65 is fitted within the cylinder and adapted for reciprocation therein (Fig. 19). A piston rod 66 is secured to the piston and extends upwardly, out of the cylinder, and is fork-shaped at its upper end 67. A roller 62a is journalled in the fork-shaped portion of the piston rod, a pin 68 being passed through the roller 62a and the forked parts of the piston rod. In the lower half of the cylinder 64 an ingress and egress opening 69 is provided, and a flexible tube 70 is connected to the opening at one end and at its other end to a source of compressed air having suitable control means therefor (not shown), whereby air under pressure may be supplied to the cylinder so as to force the piston and its rod and connected roller outwardly under pressure.

Adjacent to one end of the tracks 25 (the end remote from the assemblage 12) a bracket 71 is rigidly secured to a suitable foundation, and a cable 72 is fastened at one of its ends to the bracket 71 and at its other end to lugs 73 formed on the frame members 61 at the central part of the spreader unit, the unit being thus held from movement in a direction away from the bracket, the direction of travel of the material. The spreader unit, in the operation of the apparatus, is vertically disposed within the cylinder 57, with its rollers aligned with the axis of the cylinder, the lower rollers bearing upon the inner lower surface of the cylindrically curved material immediately above the angle irons 22, and the upper roller bearing upon the inner upper surface of the material immediately beneath the roller 45. The rollers 62 and 62a are centrally grooved in the same manner as the upper roller 45. Thus the part of the weld bar 59 which extends below the inner upper surface of the cylindrically curved material will extend into the groove of the roller 62a. A groove 74 is provided in the central upper portion of the segments 19 between the angle irons 22 so that when the cylindrically curved material is in two parts, as shown in Figs. 1, 5 and 9 and is being assembled, that part of the welding strip between the lower adjacent longitudinal edges, which extends beneath the outer lower surface of the material will extend into the groove 74, and that part of the strip which extends inwardly beyond the inner lower surface of the cylinder will extend into the grooves of the lower rollers 62. In Fig. 19 the relative positions of the roller 45, the expander roller 62a, the cylindrically curved material and the weld bar are clearly shown, and in Fig. 20 the position of these parts without the weld bar is shown.

Welding units 14 and 15 may be respectively secured to the spreader unit 13 and the frame 34, as shown in Fig. 14, for use as hereinafter described, the welding unit 14 being mounted on a bracket 75 which is welded to the forward ends of the members 61, and the welding unit 15 being mounted on a bracket 75a which is welded to the forward horizontal beams 36 of the frame 34 on the forward side thereof. The welding units illustrated are of the well-known type, known as the carbon arc welding tornado head, but it will be understood that they may comprise any suitable welding device.

A platform 76 is suitably secured on one side of the frame 34 to certain of the webs 37 on said side and is provided with braces 76a, shown in Fig. 11, but to prevent confusion not shown in Fig. 15. The platform provides sufficient space for an operator to stand thereon. A controller 77 for the motor 31 is disposed on platform 76, the source of electric current (not shown) for the operating motor being supplied through the controller 77 and the operator being enabled thereby to control the operation of the motor and the movement of the supporting unit 11.

At one end of the supporting unit 11, angle irons 78 (Figs. 11, 13 and 14) are welded to the beam 16 and a concavo-convex support 79 is secured, preferably by bolts to the angle irons 78 by means of brackets 80. Holes 81 are formed in the support 79 and corresponding holes 82 are formed in the cylindrical material to be assembled, and tapered pins 83 are passed through the opposite holes of the material and support, to secure the cylindrical material to the supporting unit 11. This construction is particularly shown in Fig. 13, where cylindrical material of one piece is being operated upon. In cases where material is in two pieces, the form of support shown in Fig. 15, having a groove for the extended edge of the weld bar, is preferable.

Where the cylinders are used as pipes or similar articles, the ends of adjacent sections may be welded together, or their ends may be riveted together, and the cylindrically curved material shown in the drawings is accordingly shown with rivet holes. In such instances two of these rivet holes are selected for the wedge pins 83, and the support 79 is accordingly formed with a plurality of holes in order that a suitable selection may be made for the wedge pins. A similar structure is provided at the rear portion of the supporting unit for securing the material thereto, which structure may be made longitudinally adjustable to fit materials of different lengths, as desired.

At the rear end of the beam 16, a bracket 84 is secured. The bracket 84 is provided with a pair of laterally spaced forwardly extending spaced arms 85 and adapted to embrace the frame members 61 of the spreader unit 13 so as to support the unit in upright position when same is not in operation.

In the operation of the apparatus the cylindrically curved material is placed upon the supporting unit 11 and secured thereto by the tapered pins as described and the unit is moved to initial welding position. The hand wheels of the adjustable roller units 40 are then turned so as to move the rollers 45 against the outer surface of the material exerting sufficient pressure to bring the spaced longitudinal edges of the material together at the welding location with the weld bar or bars therebetween if a weld bar is employed and into substantial alignment. The spreader unit 13 is disposed within the material, as aforedescribed and air is introduced into the spreader cylinder forcing the opposite ends of the unit apart as shown in Fig. 15, and forcing the upper rollers 62a of the unit against the upper adjacent longitudinal edges of the material and over the weld bar where such is employed, (which will have been previously tack-welded to one of the adjacent edges as already described), and the edges will then be accurately aligned. The operator, on the control platform, then operates the motor control which effects the forward movement of the supporting unit and draws the cylindrically curved material through the frame 34 between the rollers 45. As the spreader unit is anchored by the cable 72 against forward movement, it will remain in its fixed position with relation to the adjustable roller units 40 and continue in pressure contact with the inner surface of the material. As the material is drawn through the frame with the supporting unit 11, the adjacent edges to be connected, are tack-welded by hand at intervals along the edges.

When the entire length of the material has been thus shaped by the rollers so that the adjacent longitudinal edges have been brought into proper alignment and tack-welded together, the operation will have been completed and the properly shaped cylinder will be ready for the next operation, that is, the complete welding of the longitudinal edges.

When cylindrically curved material in two parts is used, the operation is substantially the same as aforedescribed, except that the lower adjacent longitudinal edges are tack-welded on the inside at the same time as the upper edges are being tack welded, on the outside of the material.

Where the welding units 14 and 15 are employed the complete welding together of the adjacent longitudinal edges of the material is accomplished as the material is drawn through the roller units and the tack welding is thus eliminated.

Where there is but one pair of adjacent longitudinal edges, the welding units 15 and 14 will be used consecutively, the unit 15 for the welding at the outer surface and the unit 14 for the welding at the inner surface, the material being fed through the machine a second time, after having been given a half turn to reverse the respective positions of the adjacent edges to accomplish the second welding. Where material in two parts is used, presenting two pairs of adjacent longitudinal edges, both welding units 14 and 15, will be used simultaneously, and the second weld for each pair of edges will be performed by the repeated feeding of the material through the machine similarly as aforedescribed.

While there has been hereinbefore described an approved embodiment of the apparatus of the present invention, it will be understood that many and various changes and modifications in form, structure, and arrangement may be made without departing from the spirit of this invention, and that all and any such changes and modifications are contemplated as a part of the present invention as defined in the appended claims.

I claim as my invention and desire to secure by Letters Patent:

1. Cylinder assembling apparatus comprising movable means for engaging cylindrically curved material having adjacent longitudinal edges; and means for engaging inner and outer surfaces of said material, at said edges, including a roller, said roller being grooved to permit an extension therein of the edge of a weld bar disposed between said adjacent edges and extending beyond the surface of said material adjacent said roller, and means for adjusting said roller to effect its pressure engagement with said material, said movable means being adapted to move said material with relation to said surface engaging means to effect alignment of said edges.

2. Cylinder assembling apparatus comprising movable means for engaging cylindrically curved material having adjacent longitudinal edges; and means for engaging inner and outer surfaces of said material, at said edges, including a roller, said roller being grooved to permit the extension therein of an edge of a weld bar disposed between said adjacent edges and extending beyond the surface of said material adjacent said roller, and pressure operated means engaged with said roller for effecting yielding pressure engagement of said roller with said material, said movable means being adapted to move said material with relation to said surface engaging means to effect alignment of said edges.

3. Cylinder assembling apparatus comprising movable supporting means for cylindrically curved material having adjacent longitudinal edges; and means for engaging inner and outer surfaces of said material, at said edges, including a pair of oppositely disposed rollers between which said material is adapted to be moved, at least one of said rollers being grooved to permit the extension therein of an edge of a weld bar disposed between said adjacent edges and extending beyond the surface of the material adjacent said grooved roller, and means for adjusting one of said rollers to effect its pressure engagement with said material, said movable supporting means being adapted to move said material with relation to said surface engaging means to effect alignment of said edges.

4. Cylinder assembling apparatus comprising movable supporting means for cylindrically curved material having adjacent longitudinal edges, including an arcuate basal supporting member provided with a groove to permit the extension therein of the edge of a weld bar disposed between said adjacent edges and extending beyond the surface of the material adjacent said member; and means for engaging inner and outer surfaces of said material, including an inner roller, at said edges, and means for adjusting said roller to effect its pressure engagement with said material, said movable supporting means being adapted to move said material with relation to said surface engaging means to effect alignment of said edges.

5. Cylinder assembling apparatus for use in welding adjacent longitudinal edges of cylindrical objects of different diameters comprising tracking means; a carriage, guided by said tracking means, for supporting said objects thereupon with said longitudinal edges parallel with said tracking means and for moving said objects therewith longitudinally of said tracking means to maintain said parallelism; a plurality of anti-friction elements disposed in a fixed vertical plane transverse to said carriage for engaging the outer surface of said objects; means for adjusting said elements to accommodate objects of different diameters and confining said elements to said vertical plane, said elements cooperating with that part of the carriage in said vertical plane to conform said objects to their intended size and shape at the location of said vertical plane; means for engaging the inner surfaces of said objects at said longitudinal edges thereof and opposite to said longitudinal edges, adjustable to vary the distance between the opposite points of said engagement thereof to cooperate with said adjustment of said elements to accommodate objects of different diameters; and means for engaging the outer surface of said objects at said longitudinal edges, said surface engaging means at said longitudinal edges cooperating to align said longitudinal edges at the location of said vertical plane preparatory to the welding operation.

GEORGE K. HULL.